US 6,653,359 B2

(12) United States Patent
Hilker et al.

(10) Patent No.: US 6,653,359 B2
(45) Date of Patent: Nov. 25, 2003

(54) FIRE RETARDANT SILICONE SURFACTANTS FOR USE IN INERT GAS BLOWN POLYURETHANE FOAMS

(76) Inventors: Brian L. Hilker, 2 Windsong Acres, Winfield, WV (US) 25213; Lee F. Lawler, 822 Edgewood Dr., Charleston, WV (US) 25302; Susan B. McVey, 918 Ridgeway Rd., Charleston, WV (US) 25314

(*) Notice: Subject to any disclaimer, the term of this patent is extended or adjusted under 35 U.S.C. 154(b) by 0 days.

(21) Appl. No.: 10/133,266

(22) Filed: Apr. 26, 2002

(65) Prior Publication Data

US 2003/0203984 A1 Oct. 30, 2003

(51) Int. Cl.⁷ .................................. C08J 9/04
(52) U.S. Cl. ................ 521/111; 521/112; 521/130; 521/131; 521/174
(58) Field of Search ................ 521/111, 112, 521/130, 131, 174

(56) References Cited

U.S. PATENT DOCUMENTS

| 4,814,409 | A | 3/1989 | Blevins, II et al. ........... 528/25 |
| 4,855,329 | A | 8/1989 | Blevins, II et al. ......... 521/112 |
| 5,145,879 | A | 9/1992 | Budnik et al. ............... 521/112 |
| 5,525,640 | A | 6/1996 | Gerkin et al. ............... 521/112 |
| 5,620,710 | A | 4/1997 | Fiorentini et al. ............. 425/4 |
| 5,629,027 | A | 5/1997 | Fiorentini et al. ............. 425/4 |
| 5,639,483 | A | 6/1997 | Fiorentini et al. ............. 425/4 |
| 5,665,287 | A | 9/1997 | Fiorentini et al. ............ 264/53 |
| 5,789,454 | A | 8/1998 | McVey ..................... 521/112 |
| 6,005,014 | A | 12/1999 | Blackwell et al. ............ 521/79 |
| 6,147,133 | A | 11/2000 | Sulzbach et al. ............ 521/155 |
| RE37,012 | E | 1/2001 | Fiorentini et al. ............. 425/4 |
| RE37,075 | E | 2/2001 | Fiorentini et al. ............. 425/4 |
| RE37,115 | E | 3/2001 | Fiorentini et al. ............. 425/4 |
| 6,239,186 | B1 * | 5/2001 | Mansfield et al. .......... 521/112 |
| 6,245,824 | B1 * | 6/2001 | Frey et al. ................. 521/112 |
| 6,326,413 | B1 | 12/2001 | Blackwell et al. .......... 521/130 |

FOREIGN PATENT DOCUMENTS

EP  0645226 A2  3/1995

* cited by examiner

Primary Examiner—John M. Cooney, Jr.
(74) Attorney, Agent, or Firm—Michael P. Dilworth

(57) ABSTRACT

Silicone surfactants for use in inert gas blown polyurethane foams comprise low to moderate molecular weight comb-type flame-retardant silicone copolymers possessing no high ethylene oxide content branches. The silicone surfactants yield Dissolved Gas Technology foams having improved consistency as compared to other surfactant compositions.

4 Claims, No Drawings

FIRE RETARDANT SILICONE SURFACTANTS FOR USE IN INERT GAS BLOWN POLYURETHANE FOAMS

BACKGROUND OF THE INVENTION

1. Field of the Invention

The present invention relates to silicone surfactants for use in inert gas blown polyurethane foams. More particularly, the present invention relates to silicone surfactants having dimethyl siloxane backbones with attached polyalkylene oxide polyether pendant groups that preferably are designed to have flame-retardant characteristics for use in flame retardant (FR) foam compositions.

2. Description of Relited Art

Historically, numerous grades of polyurethane foams were blown with chlorofluorocarbon (CFC) based blowing agents to reduce foam density, control foam firmness, and cool the foams to minimize discoloration, degradation, and possible foam ignition problems. Worldwide issues regarding ozone depletion in connection with certain CFCs has led to the Montreal Protocol, which phases out the use of CFCs.

Thus, the polyurethane foam industry has tried to achieve the same foam grades and quality produced using alternate blowing agents (ABAs). Many different ABAs have been evaluated, including HCFC-141b, HFC-134a, HFC-22, alkyl carbonates, and pentane. In flexible slabstock foams, in particular, other approaches have been taken, including the use of acetone, methylene chloride, carbon tetrachloride, trichloroethane, and pentanes as ABAs. While functional, these approaches also have problems, including flammability, volatile organic compound (VOC) limitations, and toxicity (for the chlorocarbons).

More recently, technology has been developed that entails the use of supplemental added inert gases, e.g., $CO_2$, as part of the blowing agent for flexible polyurethane foams, which is described in European Patent Publication No. 0 645 226 A2 (see also U.S. Pat. Nos. 5,620,710; 5,629,027; and 5,639,483; and U.S. Pat. Nos. Re. 37,012; 37,075; and 37115); U.S. Pat. No. 6,005,014; U.S. Pat. No. 6,147,133; and U.S. Pat. No. 6,326,413. This technology will hereinafter be referred to as "Dissolved Gas Technology". Auxiliary gas is added to the system as a blowing agent and is used in conjunction with the $CO_2$ generated from the reaction of isocyanate with water. More particularly, these patents disclose a process and a system for the continuous manufacture of polymeric foams. Reactive chemical components and additives comprising a low boiling blowing agent are mixed under pressure; the mixture is then frothed before chemical reaction takes place by feeding the mixture through a pressure equalizing and frothing device having a pressure-drop zone, of varying design, with eventual discharge of the froth onto a moving substrate.

U.S. Pat. Nos. 4,814,409 and 4,855,329 disclose certain polysiloxane-polyoxyalkylene compositions and their use as stabilizers in the manufacture of polyether polyurethane foam. These compositions have a polysiloxane chain substituted with at least two types of polyoxyalkylene polymers as pendants from the silicon atoms of the polysiloxane. The distinctive feature of these compositions is the specific selection of polyoxyalkylene polymers. Preferably, the polyoxyalkylene polymer pendants are provided as at least three different polyoxyalkylene polymers. One of these polyoxyalkylene polymers is composed of only oxypropylene units. This polyoxypropylene has an average molecular weight from about 130 to about 1200 excluding link and endcap. The other polyoxyalkylene polymers are composed of both oxyethylene and oxypropylene units. These references teach that silicone surfactants with lower ratios of unmodified polydimethylsiloxane groups to branched siloxane groups are preferred in flame retardant foam applications. This teaching is reinforced by Weier et al. in *Proceedings of the Polyurethane 1994 Conference*, 202 (1994).

U.S. Pat. No. 5,145,879 discloses silicone surfactants having a siloxane backbone and a mixture of high and low atomic mass oxyalkylene pendant groups, these polyether pendants having average atomic masses of 1500–6000 and 300–750 respectively. The surfactants operate in polyurethane foam compositions to provide stable foams over a range of surfactant concentrations while still producing product foams having relatively constant breathability. Also disclosed are polyurethane foam compositions which include the surfactants, a method of making polyurethane foam using the surfactants, and polyurethane foam made by the method.

U.S. Pat. No. 5,525,640 discloses that the use of inert gases as an auxiliary blowing agent in flexible polyurethane foams places unexpected requirements on the composition of the silicone surfactants used in such foams and typical silicone polyalkylene oxide polyether copolymer comb-type surfactants containing greater than about 37% ethylene oxide in the polyoxyalkylene-polysiloxane copolymer cause large cells when added inert gas is used as the blowing agent.

U.S. Pat. No. 5,789,454 discloses a method of using inert gas as an auxiliary blowing agent in the production of flexible polyurethane foams, in the presence of a blend of a silicone surfactant stabilizer and a second silicone compound. The disclosed method provides better stabilization of the foams made by such processes. Also disclosed are foam formulations containing such blends.

The disclosures of the foregoing are incorporated herein by reference in their entirety.

SUMMARY OF THE INVENTION

Previously, it was expected that all silicone surfactants currently used in the preparation of conventional slabstock foams would function well in stabilizing Dissolved Gas Technology foams. This would thus lead to fine cell structure foam prepared via all inert gas blowing. U.S. Pat. Nos. 5,525,640 and 5,789,454 taught that specific classes of surfactant structures are more applicable to Dissolved Gas Technology foaming.

It has now been discovered that other specific classes of silicone surfactants are efficient at yielding uniform low density Dissolved Gas Technology foams that exhibit good to excellent bulk foam stability and fine cell structure, particularly when lower use levels of surfactants are employed. Lower use levels of surfactants are economically desirable, but are known to exaggerate or stress any existing foam processing issues.

The present invention is directed to certain low to moderate molecular weight (hereinafter "MW") surfactants that are comb-type FR silicone copolymers possessing no high ethylene oxide ("EO") content branches that yield Dissolved Gas Technology foams having improved consistency as compared to other surfactant compositions.

More particularly, the present invention is directed to a method of producing a polyurethane foam comprising:

A) preparing a mixture comprising:
   (1) a polyether polyol containing an average of more than two hydroxyl groups per molecule, (2) an organic polyisocyanate,
(3) at least one catalyst for the production of polyurethane foams,
(4) water, and
(5) a surfactant;
   wherein the surfactant comprises a silicone/polyether composition of the formula:

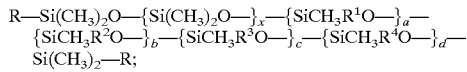

or the formula:

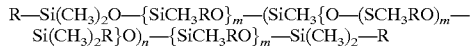

wherein:
$R^1$, $R^2$, and $R^3$ are polyalkylene oxide polyethers of the formula

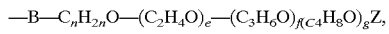

where
   $R^1$ has a blend average molecular weight in the range of from about 3000 to about 6000 grams/mole and ethylene oxide is from about 20 to about 60 weight percent of the alkylene oxide content of the polyether;
   $R^2$ has a blend average molecular weight in the range of from about 800 to about 2900 and ethylene oxide is from about 20 to about 60 weight percent of the alkylene oxide content of the polyether;
   $R^3$ has a blend average molecular weight in the range of from about 130 to about 800 grams/mole and ethylene oxide is from 0 to about 75 weight percent of the alkylene oxide content of the polyether;
   $R^4$ is an substituted or unsubstituted alkyl, alkaryl, or aryl group of $C_1$ to $C_{12}$;
   B is derived from a moiety capable of undergoing hydrosilation;
   Z is selected from the group consisting of hydrogen, $C_1$–$C_8$ alkyl or aralkyl moieties, —C(O)$Z^1$, —C(O)O$Z^1$, and —C(O)NH$Z^1$,
      where $Z^1$ represents mono-functional $C_1$–$C_8$ alkyl or aryl moieties;
   each R is independently selected from the group consisting of $R^1$, $R^2$, $R^3$, and $R^4$;
   x is 40 to 150;
   y is 5 to 40 and equals a+b+c+d,
      where b or c, but not both, may be 0,
      d/(a+b+c)=0 to 1, and
      a+b>0;
   x/y≧10;
   m=10 to 100;
   n≧4; and
   e, f, and g are defined by the molecular weight required by the polyether;
with the proviso that the total ethylene oxide content of the surfactant structure is less than 37% by weight; and
B) blowing the polyurethane foam with a pressurized inert gas.

DESCRIPTION OF THE PREFERRED EMBODIMENTS

As stated above, the present invention is directed to certain low to moderate MW surfactants that are comb-type silicone copolymers, preferably comb-type FR silicone copolymers, possessing no high EO content branches, which yield Dissolved Gas Technology foams having improved consistency as compared to other surfactant compositions.

The noted surfactant compositions showed the most differentiation when the foam was produced using relatively low levels of these stabilizing FR surfactants. Specifically, Dissolved Gas Technology foams prepared from such silicone compositions simultaneously possess good to excellent bulk foam stabilities and fine cell structures, even when lower levels of surfactant are employed.

Bulk foam stability is required during foam processing to ensure desired foam product consistency—density, IFD (Indentation Force Deflection, a measurement of the degree of foam hardness/softness), density gradient, IFD gradients, airflow, and the like, over the cross section of the foam article produced. Foam of fine cell structure is strongly desired by foam customers, who view this property as a measure of foam quality and, hence, surfactant quality/suitability.

This finding of the excellent performance of the silicone copolymers of the present invention in foam produced by Dissolved Gas Technology was particularly unexpected, since silicone copolymers of higher EO content, including ones based on branches that are 100% by weight EO, function extremely well in most varieties of conventionally blown, i.e., no added inert gas, urethane foams. As such foam is commonly produced in the commercial flexible foam market, it was believed that these surfactant compositions would also do well in the all inert gas blown foam.

Surfactant Structure

The silicone surfactants of the present invention have dimethyl siloxane backbones with attached polyalkylene oxide polyether pendant groups, i.e., "comb" copolymers. The Si—C bonds in these copolymers are hydrolytically stable, and many of these surfactants can be used in water amine premixes and are preferably designed with flame-retardant characteristics for use in flame retardant foam compositions.

The surfactants employed in the practice of this invention are silicone/polyether compositions having one of the following generalized average formulae:

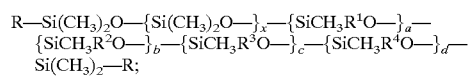

or

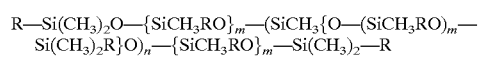

wherein:

$R^1$, $R^2$, and $R^3$ are polyalkylene oxide polyethers of the formula

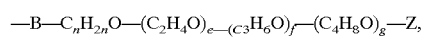

where
   $R^1$ has a blend average molecular weight ("BAMW", the numerical molar average molecular weight of a mixture of one or more distinctly different compositions) in the range of from about 3000 to about 6000 grams/mole and ethylene oxide comprises from about 20 to about 60 weight percent of the alkylene oxide content of the polyether;

$R^2$ has a BAMW in the range of from about 800 to about 2900 and ethylene oxide comprises from about 20 to about 60 weight percent of the alkylene oxide content of the polyether;

$R^3$ has a BAMW in the range of from about 130 to about 800 grams/mole and ethylene oxide comprises from 0 to about 75 weight percent of the alkylene oxide content of the polyether;

$R^4$ is a $C_1$ to $C_{12}$ substituted or unsubstituted alkyl group, an alkaryl group, or an aryl group;

B is derived from a moiety capable of undergoing hydrosilation;

Z is selected from the group consisting of hydrogen, $C_1$–$C_8$ alkyl or aralkyl moieties, —C(O)$Z^1$, —C(O)O$Z^1$, and —C(O)NH$Z^1$,
where $Z^1$ represents mono-functional $C_1$–$C_8$ alkyl or aryl moieties;

each R is independently selected from the group consisting of $R^1$, $R^2$, $R^3$, and $R^4$;

x is 40 to 150;

y is 5 to 40 and equals a+b+c+d,
where b or c, but not both, may be 0,
d/(a+b+c)=0 to 1, and
a+b>0;

$x/y \leq 10$;

m=10 to 100;

$n \leq 4$; and e, f, and g are defined by the molecular weight required by the polyether; with the proviso that the total ethylene oxide content of the surfactant structure is less than 37% by weight.

The $R^1$ moieties are preferably in the range of from about 35 to about 55% by weight of EO and, more preferably, about 40% EO. It is preferred that such moieties have a BAMW greater than 3500 daltons and, more preferably, greater than 4000 daltons. The $R^2$ moieties are also preferably in the range of from about 35 to about 55% by weight of EO and, more preferably, about 40% EO. Preferably, such moieties have a BAMW in the range of from about 1100 to about 2300 daltons and, more preferably, about 1400 to about 1600 daltons. The $R^3$ moieties range from 0 up to about 50% by weight of EO, preferably 0–40% EO. It is preferred that these moieties, when present, have a BAMW in the range of from about 300 to about 750 daltons.

There may also be more than one different polyether from each group. For example, a copolymer may comprise (a) two $R^1$-type polyethers differing in molecular weight and/or EO-content, e.g., 55% EO of 4000 MW and 44% EO of 5500 MW, and (b) an $R^2$-type polyether. In addition, butylene oxide can be substituted for propylene oxide in the polyether backbone. The polyether moieties can be linear or branched and can contain any number of carbon atoms.

The alkyl pendant groups, $R^4$, can be $C_1$–$C_{12}$ substituted or unsubstituted alkyl groups, aryl groups, or alkaryl groups. Z is preferably —C(O)CH$_3$ or CH$_3$. B is preferably an allyl derivative, e.g., propyl, or a methallyl derivative, e.g., isobutyl.

These copolymer compositions possess an x/y ratio of less than or equal to about 10 for optimal FR performance. See U.S. Pat. No. 4,814,409.

Copolymer compositions having average target MWs with low to moderate values, e.g., less than about 21,000 daltons, are preferred. The average target MW is calculated as a simple sum of the building blocks comprising the silicone polyether block copolymer structure. Specifically, this value is a sum of the average silicone backbone MW and the product of the combined BAMW of pendant groups $R^1$, $R^2$, $R^3$, and $R^1$ with the average number of branch points per average chain. Molar excess amounts of pendant groups required for commercial syntheses of these copolymers or differential rates of addition of unique pendant compositions to the silicone backbone are ignored in the simple calculation of the average target MW.

As an example, the average target MW of a silicone surfactant comprised of a silicone backbone of 6,000 daltons MW on average with an average of 8 pendants per chain with a combined pendant BAMW of 2,000 daltons would be 22,000 daltons, i.e., 6,000+(8×2,000).

Preparation of this type of copolymer is disclosed in U.S. Pat. Nos. 4,814,409 and 5,145,879, which are incorporated herein by reference.

Polyurethane Foam

The surfactants employed in the practice of the present invention are used in the preparation of foams that are blown using Dissolved Gas Technology. A given foam is usually comprised, at a minimum, of (a) a polyether polyol containing an average of more than two hydroxyl groups per molecule; (b) an organic polyisocyanate; (c) at least one catalyst for the production of polyurethane foams; (d) water; (e) a surfactant as defined above; and (f) an inert gas. All of these materials are known in the art, see U.S. Pat. Nos. 4,814,409 and 4,855,329, which are incorporated herein by reference.

The polyols have an average number of hydroxyl groups per molecule of at least slightly above 2 and, typically, from about 2.1 to about 3.5. The organic polyisocyanates contain at least two isocyanate groups, e.g., toluene diisocyanates (TDI), and the index of the foam is typically 60 to 130. The catalyst is usually an amine, such as triethylene diamine, bis(2-dimethylaminoethyl) ether, or mixtures thereof, and certain metal catalysts, including organic derivatives of tin, particularly tin compounds of octanoic acid or lauric acid. Other additives may be added to the polyurethane foam to impart specific properties to the foam, including, but not limited to, coloring agents, flame-retardants, and GEO-LITE® Modifier foam additives (available from OSi Specialties, Inc. of Greenwich, Conn.).

The inert gas is one that is soluble in the foam formulation at elevated pressures, but will come out of solution, i.e., blow, at atmospheric pressure. An example of such a gas is $CO_2$, but nitrogen, air, or other common gases, including hydrocarbon gases, such as methane and ethane, can also be used.

The surfactants should be of the type described above and should be present at from about 0.05 to about 5.0 wt. percent of the total reaction mixture, preferably from about 0.8 to about 2.0 wt. percent. This weight percentage only includes the block copolymer species and not the excess polyether and/or diluent or carrier of the surfactant. The diluent or carrier can be used for accurate metering purposes and/or surfactant viscosity reduction.

The foam is manufactured by mixing the ingredients together and putting them under high pressure, i.e., a pressure that is at least greater than atmospheric pressure, so that the inert gas is dissolved in the foaming mixture. Then, the mixture is subjected to controlled pressure reduction, which causes the gas to form bubbles at nucleation sites in the foaming system and thus act as a blowing agent. This produces a reduced density foam. For a more complete description of the process and the equipment required therein, see European Patent Publication No. 0 645 226 A2 or an equivalent thereof, e.g, U.S. Pat. No. 5,665,287; as well as U.S. Pat. No. 6,005,014; U.S. Pat. No. 6,147,133, and U.S. Pat. No. 6,326,413; which are all incorporated herein by reference.

The foam cell structure is typically uniform and fine and the bulk foam stability is good to excellent when Dissolved Gas Technology foams are prepared with the noted surfactant compositions, whereas, comparatively higher average target MW surfactant compositions and/or those with high EO content branches produce foams of coarser cell structure and/or reduced bulk foam stability. Fine cell structures are highly desired, with smaller cells, i.e., more cells per cm, in such foams being most desirable. Specifically, more than 7 cells per centimeter are normally desired and more than 14–16 cells per centimeter are preferred.

The polyurethane foams produced in accordance with the present invention can be used in the same fields as conventional polyether polyurethane foams. For example, the foams of the present invention can be used to advantage in the manufacture of textile interliners, cushions, mattresses, padding, carpet underlay, packaging, gaskets, sealers, thermal insulators, and the like.

The advantages and the important features of the present invention will be more apparent from the following examples.

EXAMPLES

Examples 1–6

Several surfactant compositions were tested to determine if they would be acceptable in all $CO_2$ blown polyurethane foams. These experiments were run on a laboratory foam line (Beamech Pilot Scale Continuous $CO_2$ Equipment) equipped with systems capable of utilizing $CO_2$ as an auxiliary blowing agent. The system utilized was similar to those described in U.S. Pat. No. 6,005,014 and U.S. Pat. No. 6,326,413. The foams studied used a conventional formulation, as set forth in Table 1 below.

TABLE I

Formulation

| Component | Amount (Parts by Weight) |
|---|---|
| Polyol 1 | 100 |
| Water | 4.8 |
| $CO_2$ | 3.0 |
| Catalyst 1 | ~0.18 |
| Catalyst 2 | ~0.25 |
| Silicone Surfactant | Varied |
| Toluene Diisocyanate | (115 Index) |

The chemicals used in this formulation were as follows:

Polyol 1 is a 3000 dalton MW, nominally trifunctional, slabstock polyol, approximately 56 OH number;

Catalyst 1 is stannous octoate;

Catalyst 2 is an amine catalyst sold by OSi Specialties as NIAX catalyst A-133;

The typical machine conditions included high pressure mixing, a mix-head pressure of 150–250 psi, and a froth lay-down pressure of 100–200 psi to produce typical buns about 36 inches wide by about 15 feet long by about 25 inches high.

The surfactants used in these experiments were as follows, where

M is $(CH_3)_3Si_{1/2}$—,

D is —$O_{1/2}Si(CH_3)_2O_{1/2}$—,

D" is —$O_{1/2}Si(CH_3)R'O_{1/2}$—, and

R' is $R^1$, $R^2$, or $R^3$.

Surfactant #1=$MD_xD"_yM$, where R' is composed of two different methyl capped polyethers with 0 mole percent of the branches being ≧75% by weight EO content and a target average MW of about 17,500 daltons. This is not an FR surfactant by the above definition.

Surfactant #2=$MD_xD"_yM$, where R' is composed of two different acetoxy capped polyethers with about 80 mole percent of the branches being ≧75% by weight EO content and a target average MW of about 14,500 daltons. This is an FR surfactant by the above definition.

Surfactant #3=$MD_xD"_yM$, where R' is composed of three different acetoxy capped polyethers with about 40 mole percent of the branches being ≧75% by weight EO content and a target average MW of about 16,700 daltons. Polyether a and polyether b are blended together, then combined with polyether c at a ratio of (polyether a+polyether b)/polyether c of 1.6. This is an FR surfactant by the above definition.

Surfactant #4=$MD_xD"_yM$, where R' is composed of three different methyl capped polyethers with about 60 mole percent of the branches being ≧75% by weight EO content and a target average MW of about 14,600 daltons. Polyether a and polyether b are blended, then combined with polyether c at a ratio of (polyether a+polyether b)/polyether c of 1.05. This is an FR surfactant by the above definition.

Surfactant #5=$MD_xD"_yM$, where R' is composed of two different acetoxy capped polyethers with 0 mole percent of the branches being ≧75% by weight EO content and a target average MW of about 21,200 daltons. This is an FR surfactant by the above definition.

Surfactant #6=$MD_xD"_yM$, where R' is composed of two different acetoxy capped polyethers with 0 mole percent of the branches being ≧75% by weight EO content and a target average MW of about 17,400 daltons. This is an FR surfactant by the above definition.

These experiments were designed to directly compare critical processing characteristics of foam of approximately equivalent airflow properties. Specifically, all of the foams were about 3 to 5 NOPCO units in airflow, a standard measurement in the polyurethane foam industry using a NOPCO breathability apparatus (adjusted back pressure to 0.5 inch of water and read air flow in standard cubic feet per minute). These foams were produced via the laboratory foam line using virtually identical chemical formulations (Table 1) and mechanical foaming conditions with the primary difference between experiments being the replacement of one surfactant composition with another. For some surfactants, minor catalyst adjustments (changes in relative amounts by weight) were required to the above formulation to produce foam of comparable airflow for valid foam characteristic comparisons. The resultant foams were rated for relative bulk foam stability and relative cell structure properties according to the definitions shown below. These results are tabulated in Table 2. These foams were prepared using moderate levels (0.55–0.80 pphp, i.e., parts by weight per hundred parts by weight of polyol) of silicone surfactant, not including excess polyether or diluent.

by Dissolved Gas Technology. These Examples compare the properties of foams prepared from three separate surfactant compositions, but at three different surfactant levels. Specifically, these levels were chosen as moderate to lower use levels to exaggerate foam performance differences. All foams were prepared using the Table 1 formulation with occasional minor modification to catalyst levels to ensure foam of comparable airflow properties. These foam processing results are tabulated in Table 3.

TABLE 2

The Effect of Average Target Molecular Weight of the Surfactant and High Ethylene Oxide Content Branches in the Surfactant on Bulk Foam Stability and Cell Structure Properties

| Example | Surfactant | Calculated Average Target MW | Approximate Mole % of Branches ≥ 75% EO | Bulk Foam Stability* | Cell Structure Rating** | FR Surfactant*** | Comment |
|---|---|---|---|---|---|---|---|
| 1 | #1 | 17,500 | 0 | Good | Fine | N | Non-FR |
| 2 | #2 | 14,500 | 80 | Excellent | Very Coarse | Y | High EO Branches, >37% EO |
| 3 | #3 | 16,700 | 40 | Good | Coarse | Y | High EO Branches |
| 4 | #4 | 14,600 | 60 | Poor | Coarse/Moderate | Y | High EO Branches |
| 5 | #5 | 21,200 | 0 | Good | Moderate | Y | High MW |
| 6 | #6 | 17,400 | 0 | Good | Fine/Very Fine | Y | Most Preferred |

* The Relative Foam Stability rating of "Excellent" equates to an average of less than about 5% bulk foam settling (percentage of height lost from maximum bun height during processing to the final bun height measured a few minutes after foam pouring), whereas a rating of "Poor" equates to an average of greater than about 15% settling. The other designations fall between these two extremes.
** The Relative Cell Structure scale spans from "Very Coarse" which is less than about 7 cells/cm on average to "Very Fine" which represents greater than about 16–18 cells/cm on average. The other designations fall between these two extremes.
*** The FR designation is related to the target composition x/y ratio being less than or equal to about 10.

As indicated by the Table 2 data, there is a striking contrast between the surfactant performance of a lower average target molecular weight FR surfactant without high weight percent EO branches versus those with higher average target molecular weight and/or including high weight percent EO branches. Preferred surfactant compositions, such as Example 6, provide Dissolved Gas Technology based foams with both good bulk foam stability and fine to very fine uniform cell structures. Higher average target molecular weight surfactant compositions, such as Example 5, show measurable losses in fineness of cell structure. Similarly, the higher weight percent EO branch-containing surfactant compositions, Examples 2, 3, and 4, show much larger relative reductions in both bulk foam stability and/or cell structure fineness. Example 1, a comparative example, shows suitable foam performance on these two critical processing characteristics, but is a non-FR surfactant composition by the above definition.

Examples 7–15

Surfactant Type and Level Foaming Results

The following Examples also focus on foam processing properties of laboratory foam line produced foams prepared

TABLE 3

The Effect of Surfactant Type and Level on Final Foam Height and Cell Structure Properties

| Surfactant 5 | Example 7 | Example 8 | Example 9 |
|---|---|---|---|
| Use Level, pphp | 0.46 | 0.55 | 0.69 |
| Approximate Final Foam Height, inches | 16.5 | 24.5 | 25.0 |
| Cell Structure Rating* | — | — | 6.0 |

| Surfactant 6 | Example 10 | Example 11 | Example 12 |
|---|---|---|---|
| Use Level, pphp | 0.43 | 0.55 | 0.69 |
| Approximate Final Foam Height, inches | 25.0 | 28.5 | 30.0 |
| Cell Structure Rating* | 3.5 | 3.5 | 5.0 |

| Surfactant 1 | Example 13 | Example 14 | Example 15 |
|---|---|---|---|
| Use Level, pphp | 0.40 | 0.53 | 0.66 |
| Approximate Final Foam Height, inches | 25.0 | 28.0 | 28.0 |
| Cell Structure Rating* | 4.5 | 3.5 | 5.5 |

*This Relative Cell Structure scale spans from "3" which represents greater than about 16–18 cells/cm on average to "6" which represents greater than about 10–12 cells/cm on average. The other designations fall between these two extremes.

The data in Table 3 show that Surfactant 5 yielded Dissolved Gas Technology foam buns of lower bulk stability than Surfactant 6, e.g, high final foam height, particularly when formulated with low surfactant levels (See Examples 7–9 vs. 10–12). Lower final foam height, e.g., less than about 25 inches in final foam height in these experiments results from significant bulk foam settling. Samples with larger amounts of bulk settling were not tested for cell structure.

The foam processing data for both Surfactant 6 and Surfactant 1 reveal favorable magnitudes of bulk foam stability and fineness of cell structure even at relatively low surfactant loading (See Examples 10–12 and Examples 13–15). In direct comparison, the combined resulting properties (bulk foam stability and fineness of cell structures) of foam prepared from Surfactant 6 were equal to or slightly preferred vs. those of foam prepared from Surfactant 1. Surfactant 1 is non-FR by the above definitions, while the composition of Surfactant 6 is FR.

In view of the many changes and modifications that can be made without departing from principles underlying the invention, reference should be made to the appended claims for an understanding of the scope of the protection to be afforded the invention.

What is claimed is:

1. A method of producing a flame retardant polyurethane foam comprising:

A) preparing a mixture comprising:
   (1) a polyether polyol containing an average of more than two hydroxyl groups per molecule,
   (2) an organic polyisocyanate,
   (3) at least one catalyst for the production of polyurethane foams,
   (4) water, and
   (5) a surfactant;
   wherein the surfactant consists of a silicone/polyether composition of the formula:

$MD_xD'_yM$ wherein:
   M is $(CH_3)_3SiO_{1/2}$—,
   D is —$O_{1/2}Si(CH_3)_2O_{1/2}$—,
   D" is —$O_{1/2}Si(CH_3)R'O_{1/2}$—,
   x is 40 to 150;
   y is 5 to 40;
   x/y≦10; and
   R' comprises two different acetoxy capped polyethers with 0 mole percent of the branches being ≧75% by weight ethylene oxide content and a target average molecular weight of about 17,400 daltons;
   with the proviso that the total ethylene oxide content of the surfactant structure is less than 37% by weight; and B) blowing the polyurethane foam with a pressurized inert gas.

2. A flame retardant polyurethane foam prepared by a method comprising:

A) preparing a mixture comprising:
   (1) a polyether polyol containing an average of more than two hydroxyl groups per molecule,
   (2) an organic polyisocyanate,
   (3) at least one catalyst for the production of polyurethane foams,
   (4) water, and
   (5) a surfactant;
   wherein the surfactant consists of a silicone/polyether composition of the formula:

$MD_xD''_yM$ wherein:
   M is $(CH_3)_3SiO_{1/2}$—,
   D is —$O_{1/2}Si(CH_3)_2O_{1/2}$—,
   D" is —$O_{1/2}Si(CH_3)R'O_{1/2}$—,
   x is 40 to 150;
   y is 5 to 40;
   x/y≦10; and
   R' comprises two different acetoxy capped polyethers with 0 mole percent of the branches being ≧75% by weight ethylene oxide content and a target average molecular weight of about 17,400 daltons;
   with the proviso that the total ethylene oxide content of the surfactant structure is less than 37% by weight; and B) blowing the polyurethane foam with a pressurized inert gas.

3. The method of claim 1 wherein the inert gas is carbon dioxide.

4. The foam of claim 2 wherein the inert gas is carbon dioxide.

* * * * *